(12) United States Patent
Ramaswamy et al.

(10) Patent No.: US 12,531,442 B2
(45) Date of Patent: Jan. 20, 2026

(54) METHOD AND SYSTEM FOR WIRELESS POWER DELIVERY

(71) Applicant: Reach Power, Inc., Redwood City, CA (US)

(72) Inventors: Varun Ramaswamy, Emeryville, CA (US); Gustavo Navarro, Emeryville, CA (US); Christopher Joseph Davlantes, Emeryville, CA (US)

(73) Assignee: Reach Power, Inc., Redwood City, CA (US)

( * ) Notice: Subject to any disclaimer, the term of this patent is extended or adjusted under 35 U.S.C. 154(b) by 0 days.

(21) Appl. No.: 18/583,513

(22) Filed: Feb. 21, 2024

(65) Prior Publication Data
US 2025/0226702 A1 Jul. 10, 2025

Related U.S. Application Data

(60) Provisional application No. 63/449,855, filed on Mar. 3, 2023, provisional application No. 63/447,178, filed on Feb. 21, 2023.

(51) Int. Cl.
| | | |
|---|---|---|
| *H02J 50/80* | (2016.01) | |
| *H02J 50/20* | (2016.01) | |
| *H02J 50/40* | (2016.01) | |
| *H02J 50/50* | (2016.01) | |
| *H04L 5/00* | (2006.01) | |

(52) U.S. Cl.
CPC .............. *H02J 50/80* (2016.02); *H02J 50/20* (2016.02); *H02J 50/402* (2020.01); *H02J 50/50* (2016.02); *H04L 5/0048* (2013.01)

(58) Field of Classification Search
CPC .......... H02J 50/80; H02J 50/20; H02J 50/402; H02J 50/50; H04L 5/0048
See application file for complete search history.

(56) References Cited

U.S. PATENT DOCUMENTS

| | | |
|---|---|---|
| 6,967,462 B1 | 11/2005 | Landis |
| 7,424,058 B1 | 9/2008 | Staley et al. |
| 7,502,340 B1 | 3/2009 | Chuang et al. |
| 8,134,516 B1 | 3/2012 | Yaghjian et al. |

(Continued)

FOREIGN PATENT DOCUMENTS

CN 104702105 A 6/2015

OTHER PUBLICATIONS

Wikipedia contributors. "Power dividers and directional couplers", Wikipedia, The Free Encyclopedia. Wikipedia, The Free Encyclopedia, Mar. 1, 2020. Web. Jun. 5, 2020. (Year: 2020).

(Continued)

*Primary Examiner* — Rexford N Barnie
*Assistant Examiner* — Rasem Mourad
(74) *Attorney, Agent, or Firm* — Jeffrey Schox; Samuel Rosenthal

(57) ABSTRACT

A system for wireless power delivery, preferably including a plurality of transmitters and one or more receivers, and optionally including one or more relay nodes, pilot tone transmitters, and/or controllers. A method for wireless power delivery, preferably including synchronizing transmitter frequencies, determining single-transmitter configurations, and/or determining multi-transmitter configurations, and optionally including maintaining coherence.

20 Claims, 5 Drawing Sheets

(56) References Cited

U.S. PATENT DOCUMENTS

| | | |
|---|---|---|
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,650,418 B2 | 2/2014 | Wu |
| 8,682,318 B2 | 3/2014 | Lee et al. |
| 8,766,544 B2 | 7/2014 | Velazquez |
| 8,772,967 B1 | 7/2014 | Ikriannikov et al. |
| 9,142,990 B2 | 9/2015 | Keeling et al. |
| 9,288,769 B2 | 3/2016 | Tandai et al. |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 | 1/2017 | Shih |
| 9,608,454 B2 | 3/2017 | Sankar |
| 9,711,978 B2 | 7/2017 | Manova-Elssibony et al. |
| 9,853,486 B2 | 12/2017 | Liu et al. |
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 10,069,592 B1 | 9/2018 | Krunz et al. |
| 10,798,665 B2 | 10/2020 | Navarro et al. |
| 2002/0111905 A1 | 8/2002 | Nagafuchi et al. |
| 2004/0203846 A1 | 10/2004 | Caronni et al. |
| 2005/0090287 A1 | 4/2005 | Rofougaran |
| 2005/0170788 A1 | 8/2005 | Tanaka et al. |
| 2006/0088123 A1 | 4/2006 | Jensen et al. |
| 2007/0155347 A1 | 7/2007 | Heuermann et al. |
| 2007/0156343 A1 | 7/2007 | Rayan et al. |
| 2007/0178945 A1* | 8/2007 | Cook .................. H04B 1/1607 455/572 |
| 2007/0243851 A1 | 10/2007 | Shoarinejad et al. |
| 2008/0057880 A1 | 3/2008 | Copeland |
| 2009/0210366 A1 | 8/2009 | Sakata et al. |
| 2009/0284082 A1 | 11/2009 | Mohammadian |
| 2010/0033021 A1 | 2/2010 | Bennett |
| 2010/0222010 A1 | 9/2010 | Ozaki et al. |
| 2010/0226448 A1 | 9/2010 | Dent |
| 2011/0141148 A1 | 6/2011 | Hill et al. |
| 2011/0148215 A1 | 6/2011 | Marzetta et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0109606 A1 | 5/2012 | Dotan et al. |
| 2012/0146425 A1 | 6/2012 | Lee et al. |
| 2012/0217818 A1 | 8/2012 | Yerazunis et al. |
| 2012/0300592 A1 | 11/2012 | Perry |
| 2012/0313450 A1 | 12/2012 | Nam et al. |
| 2013/0043734 A1 | 2/2013 | Stone et al. |
| 2013/0066471 A1 | 3/2013 | Wang et al. |
| 2013/0113299 A1 | 5/2013 | Von et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0106761 A1 | 4/2014 | Lee et al. |
| 2014/0133322 A1 | 5/2014 | Steer et al. |
| 2014/0139034 A1 | 5/2014 | Sankar et al. |
| 2014/0203769 A1 | 7/2014 | Keeling et al. |
| 2014/0214743 A1 | 7/2014 | Chester et al. |
| 2014/0227981 A1 | 8/2014 | Pecen et al. |
| 2014/0239305 A1 | 8/2014 | Shah et al. |
| 2014/0242918 A1 | 8/2014 | Weissman et al. |
| 2014/0361741 A1 | 12/2014 | Von et al. |
| 2014/0375253 A1 | 12/2014 | Leabman et al. |
| 2015/0123496 A1 | 5/2015 | Leabman et al. |
| 2015/0181539 A1 | 6/2015 | Aiba et al. |
| 2015/0280444 A1 | 10/2015 | Smith et al. |
| 2015/0349542 A1 | 12/2015 | Yamamoto et al. |
| 2015/0351054 A1 | 12/2015 | Immonen et al. |
| 2015/0357827 A1 | 12/2015 | Muratov et al. |
| 2015/0371771 A1 | 12/2015 | Abu Qahouq |
| 2016/0026625 A1 | 1/2016 | Walker |
| 2016/0054395 A1 | 2/2016 | Bell et al. |
| 2016/0054396 A1 | 2/2016 | Bell et al. |
| 2016/0056966 A1 | 2/2016 | Bell |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0099758 A1 | 4/2016 | Bell et al. |
| 2016/0140115 A1 | 5/2016 | Walker |
| 2016/0156268 A1 | 6/2016 | Thomas et al. |
| 2016/0165545 A1 | 6/2016 | Ouchi et al. |
| 2016/0197494 A1 | 7/2016 | Kwon et al. |
| 2016/0216301 A1 | 7/2016 | Holzworth et al. |
| 2016/0233724 A1 | 8/2016 | Bae et al. |
| 2016/0337085 A1 | 11/2016 | Yu et al. |
| 2016/0344431 A1 | 11/2016 | Srirattana et al. |
| 2016/0379753 A1 | 12/2016 | Jang et al. |
| 2017/0025885 A1 | 1/2017 | Blakely et al. |
| 2017/0077736 A1 | 3/2017 | Leabman |
| 2017/0149294 A1* | 5/2017 | Wight .................. H02J 50/20 |
| 2017/0176552 A1* | 6/2017 | Reykowski ........ G01R 33/3692 |
| 2017/0201289 A1 | 7/2017 | Zhang et al. |
| 2017/0261631 A1 | 9/2017 | Donderici et al. |
| 2017/0294941 A1 | 10/2017 | Long et al. |
| 2017/0366242 A1 | 12/2017 | Lee et al. |
| 2018/0118045 A1 | 5/2018 | Gruzen et al. |
| 2018/0131413 A1 | 5/2018 | Won et al. |
| 2018/0352519 A1 | 12/2018 | Navarro et al. |
| 2019/0296547 A1 | 9/2019 | Kelly et al. |
| 2019/0364492 A1 | 11/2019 | Azizi et al. |
| 2020/0112928 A1* | 4/2020 | Navarro ............. H04W 52/367 |
| 2022/0038137 A1* | 2/2022 | Kajiwara ................ H02J 50/40 |
| 2022/0337096 A1 | 10/2022 | Davlantes et al. |

OTHER PUBLICATIONS

Brown, William C., "The history of power transmission by radio waves" IEEE Transactions on microwave theory and techniques 32, No. 9 (1984): 1230-1242.

Harrington, Roger F., "Effect of Antenna Size on Gain, Bandwidth, and Efficiency", Journal of Research of the National Bureau of Standards—D. Radio Propagation vol. 64D, No. 1, Jan.-Feb. 1960, 12 pages.

Ivrlac, Michel T., "High-Efficiency Super-Gain Antenna Arrays", 2010 International ITG Workshop on Smart Antennas (WSA 2010), 369-374.

Kumar , et al., "Memetic search in differential evolution algorithm." In:arXiv preprint. Aug. 1, 2014 Retreived from <https://arxiv.org/ftp/arxiv/papers/1408/1408.0101.pdf> entire document.

Ouassal, Hassna, et al., "Decentralized Frequency Synchronization in Distributed Antenna Arrays With Quantized Frequency States and Directed Communications", IEEE Transactions on Antennas and Propagation, vol. 68, No. 7, Jul. 2020.

Wang, Shaodi , et al., "Proceed: A Pareto optimization-based circuit-level evaluator for emerging devices", IEEE Transactions on Very Large Scale Integration (VLSI) Systems. Feb. 12, 2015.

* cited by examiner

METHOD AND SYSTEM FOR WIRELESS POWER DELIVERY

CROSS-REFERENCE TO RELATED APPLICATIONS

This application claims the benefit of U.S. Provisional Application Ser. No. 63/447,178, filed on 21 Feb. 2023, and of U.S. Provisional Application Ser. No. 63/449,855, filed on 3 Mar. 2023, each of which is incorporated in its entirety by this reference.

STATEMENT OF GOVERNMENT SUPPORT

This invention was made with government support under Contract No. HR0011-21-C-0126 awarded by the Defense Advanced Research Projects Agency. The government has certain rights in the invention.

TECHNICAL FIELD

This invention relates generally to the wireless power delivery field, and more specifically to a new and useful method and system for wireless power delivery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2A:
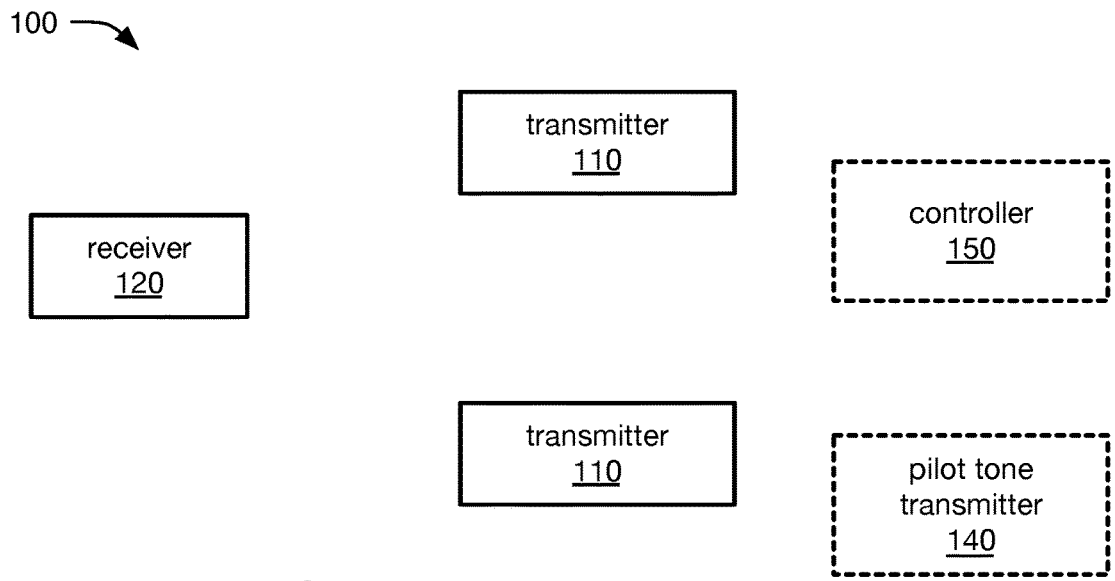
FIGS. 2A-2C are schematic representations of a first, second, and third embodiment, respectively, of a system for wireless power delivery.
Figure 2B:
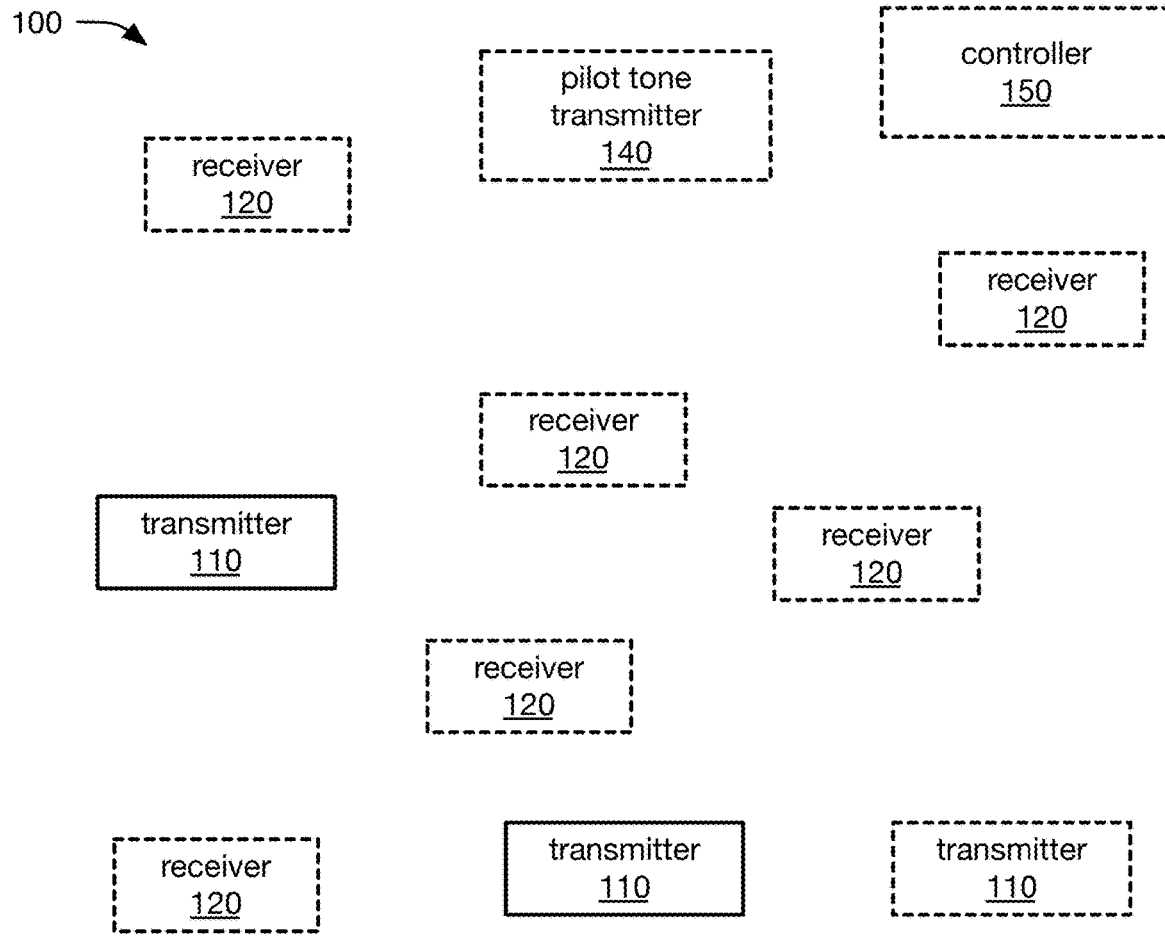
Figure 2C:
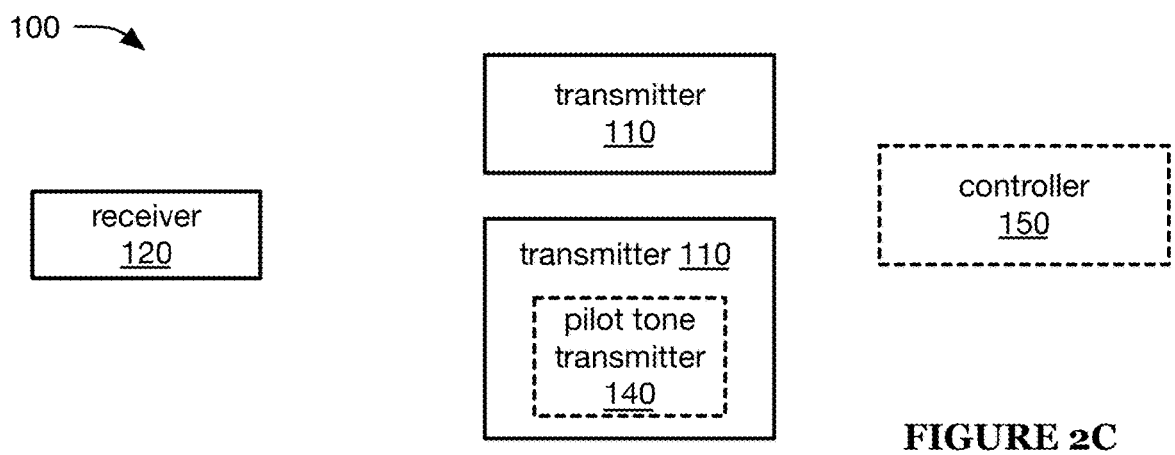

A system 100 for wireless power delivery preferably includes a plurality of transmitters 110 and one or more receivers 120, and can optionally include one or more relay nodes 130, pilot tone transmitters 140, and/or controllers 150 (e.g., as shown by way of examples in FIGS. 2A-2C). However, the system can additionally or alternatively include any other suitable elements in any suitable arrangement.

Figure 1:
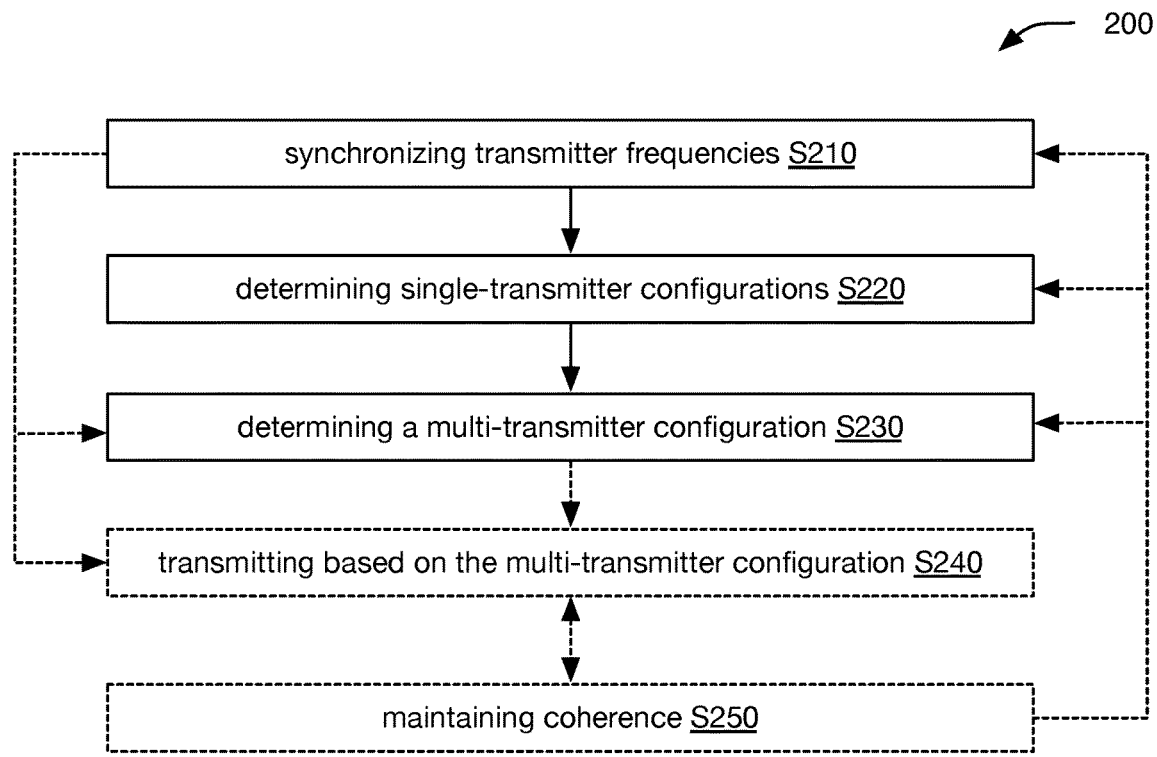
FIG. 1 is a schematic representation of an embodiment of a method for wireless power delivery.

A method 200 for wireless power delivery preferably includes synchronizing transmitter frequencies S210, determining single-transmitter configurations S220, and/or determining multi-transmitter configurations S230, and can optionally include transmitting based on the multi-transmitter configuration S240 and/or maintaining coherence S250 (e.g., as shown in FIGS. 1 and/or 5). However, the method can additionally or alternatively include any other suitable elements performed in any suitable manner. The method is preferably performed using the system for wireless power delivery described herein, but can additionally or alternatively be performed using any other suitable systems.

In some embodiments, the system and/or method can include one or more elements (e.g., the entire system and/or any suitable elements thereof, the entire method and/or any suitable elements thereof, etc.) such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference.

2. Technical Advantages

Variants of the technology can confer several benefits over conventional systems and/or methods.

First, variants of the technology can enable and/or enhance system redundancy and/or resiliency (e.g., to damage and/or failure of one or more transmitters), such as enabling and/or facilitating graceful degradation of power transmission (e.g., rather than complete power transmission failure or interruption). For example, if one or more transmitters are damaged (or otherwise unable/unavailable to participate in power transmission, unable/unavailable to transmit at full or nominal power levels, etc.), the remaining transmitters can continue operating to deliver power (e.g., delivering a lower total amount of power than when all transmitters participate). In some such examples, the remaining transmitters may continue operation without change (or without substantial change) to their configurations (e.g., without altering power transmission parameters such as phased array parameters).

Second, variants of the technology can enable efficient scaling of transmit power and/or efficiency as the number of transmitters increase. For example, through coherent transmitter operation, the throughput can scale approximately quadratically with the number of transmitters operating in coherence (e.g., as compared with approximately linear scaling at best for a plurality of transmitters out of coherence with each other). Consistent with this difference in scaling, a set of transmitters that are transmitting coherently could be observed to achieve a certain power transmission efficiency to one or more receivers; if coherence between the transmitters of this set were lost (e.g., while keeping all other characteristics of their transmission behavior unchanged, such as wherein their transmission frequencies drift apart from one another such that they are no longer substantially equal, but all configuration parameters of the phased arrays are unchanged), a significant decrease in power transmission efficiency to the one or more receivers would typically result.

However, the technology can additionally or alternatively confer any other suitable benefits.

3. System

The system preferably includes a plurality of transmitters. The plurality of transmitters preferably function (e.g., jointly function) to transmit power wirelessly (e.g., to the one or more receivers of the system).

Each of the transmitters (or any suitable subset thereof) can include one or more elements such as described (e.g., regarding the transmitter) in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference.

Figure 3A:
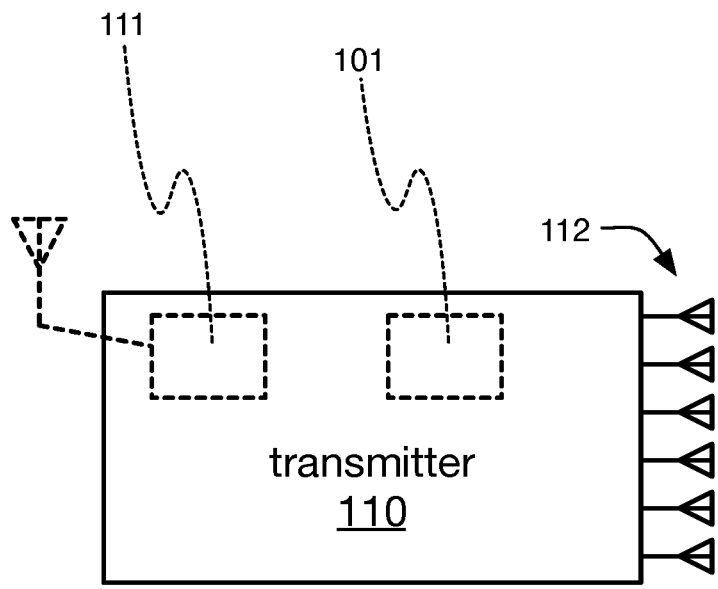
FIGS. 3A-3B are schematic representations of an example of a transmitter and receiver, respectively, of the system.

Each of the transmitters (or any suitable subset thereof) can optionally include one or more frequency synchronization modules in (e.g., as shown in FIG. 3A). The frequency synchronization modules preferably function (e.g., independently, cooperatively, etc.) to enable synchronization of the power transmission frequency used by the different transmitters of the system.

In a first example, the frequency synchronization module includes a GPS disciplined oscillator (GPS-DO), wherein timing signals from one or more GPS satellites (and/or any other suitable GNSS satellites) are used as (and/or to generate) a pilot tone.

Figure 4A:
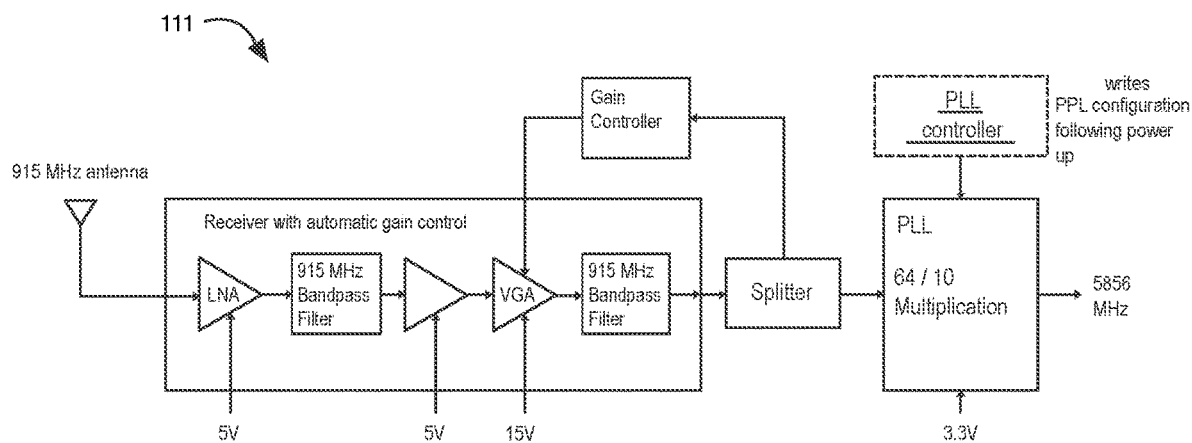
FIGS. 4A-4B are schematic representations of a first and second embodiment, respectively, of a frequency synchronization module of the system.

In a second example (e.g., in which the transmitters transmit power within a power transmission band and utilize a pilot tone sent at a frequency outside the power transmission band), the frequency synchronization module can include a pilot tone receiver (e.g., including one or more antennas, amplifiers, bandpass filters, etc.) configured to receive at the pilot tone frequency, a phase-locked loop (PLL) configured to convert from the pilot tone frequency to a frequency within the power transmission band (e.g., by performing a frequency multiplication, such as a 64/10 frequency multiplication), and/or any other suitable elements (e.g., as shown in FIG. 4A).

Figure 4B:
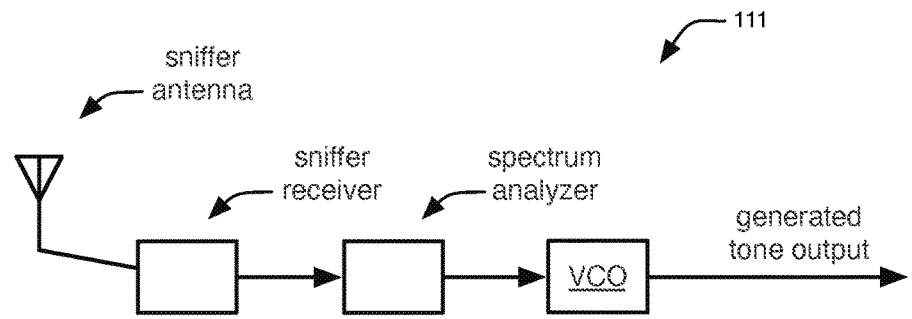
Figure 5:
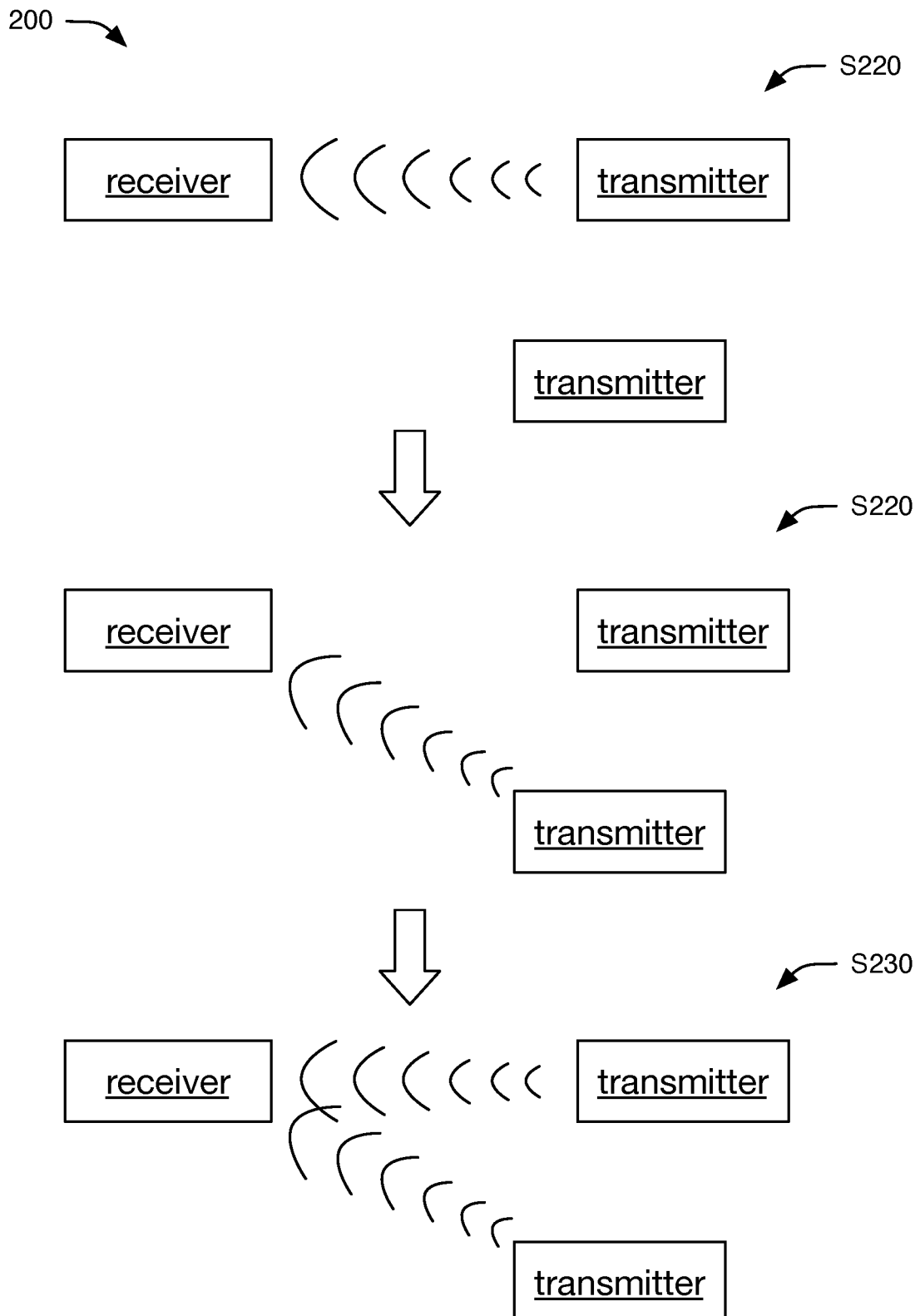
FIG. 5 is a schematic representation of an embodiment of a portion of the method.

In a third example (e.g., wherein a consensus-based approach, rather than a pilot tone, is used to achieve frequency synchronization), the frequency synchronization module can include one or more sniffers configured to sample power transmissions within the power transmission band (e.g., including one or more antennas, amplifiers, bandpass filters, etc.), spectrum analyzers (e.g., including one or more analog-to-digital converters, discrete Fourier transform modules, logic elements, etc.), and/or variable-frequency oscillators (e.g., voltage-controlled oscillator (VCO)), such as shown by way of example in FIG. 4B. In this example, the spectrum analyzer is preferably configured to receive signals from the sniffer and determine the frequencies present therein (e.g., at the DFT module) and/or to determine a desired output frequency based on the detected frequencies (e.g., at the logic element). The variable-frequency oscillator (e.g., VCO) preferably functions to output the desired frequency (e.g., the frequency determined by the spectrum analyzer).

However, the transmitters can additionally or alternatively include any other suitable frequency synchronization modules.

The transmitter(s) of the system preferably includes one or more transmission elements 112 (e.g., elements configured to transmit electromagnetic radiation, such as RF and/or microwave power) such as transmission antennas (e.g., phased antenna array). The antennas and/or other transmission elements can be narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. The transmission elements can optionally include one or more frequency adaptation elements (e.g., configured to control the transmission and/or resonance frequencies of the transmission elements).

The transmission elements can include a plurality of controllable (e.g., adaptive) transmission elements (e.g., loops, monopoles, dipoles, etc.), such as phase- and/or amplitude-controllable elements (e.g., as shown in FIG. 3A). For example, the transmission elements can define one or more controllable (e.g., adaptive) antenna arrays (e.g., linear array, planar array, 3-D array, etc.; phased array, electronically controllable array, etc.).

The transmission elements can include a plurality of active elements (e.g., elements, such as antennas, configured to be actively driven by feeds), such as independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antennas of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The transmission elements can additionally or alternatively include one or more passive antennas (e.g., configured to electrically and/or resonantly couple to one or more of the active antennas, thereby altering transmission characteristics of the transmitter). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components.

Although referred to herein as antennas (e.g., active antennas, passive antennas, etc.), a person of skill in the art will recognize that the transmission elements can additionally or alternatively include transmission elements (e.g., active transmission elements, passive transmission elements, etc.) of any other suitable types. Although referred to herein as an antenna array, a person of skill in the art will recognize that the transmission elements can additionally or alternatively include arrays of any other suitable transmission elements and/or transmission elements in any other suitable arrangements (e.g., arrangements other than arrays, such as aperiodic arrangements).

The transmitter is preferably coupled to (e.g., electrically coupled to, such as connected by conductive wires; configured to receive power from; etc.) one or more power sources. The power sources can include remote power sources (e.g., power grid, external power generator, external power storage device, etc.) and/or power storage modules (e.g., wherein the power delivery device includes the power storage module(s)). The power storage module preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The primary battery can have a lithium thionyl chloride chemistry, zinc-carbon chemistry, zinc chloride chemistry, alkaline chemistry, oxy nickel hydroxide chemistry, lithium-iron disulfide chemistry, lithium-manganese oxide chemistry, zinc-air chemistry, silver oxide chemistry, or any other suitable chemistry.

Further, the system can additionally or alternatively include any other suitable transmitters.

The system preferably includes one or more receivers. Each receiver preferably functions to receive power wirelessly (e.g., electromagnetic radiation transmitted to the receiver, preferably propagating or "far-field" radiation but additionally or alternatively evanescent or "near-field" radiation; preferably received from one or more transmitters of the system) and to couple the received power into the receiver.

Each of the receivers (or any suitable subset thereof) can include one or more elements such as described (e.g., regarding the receiver) in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference.

Figure 3B:
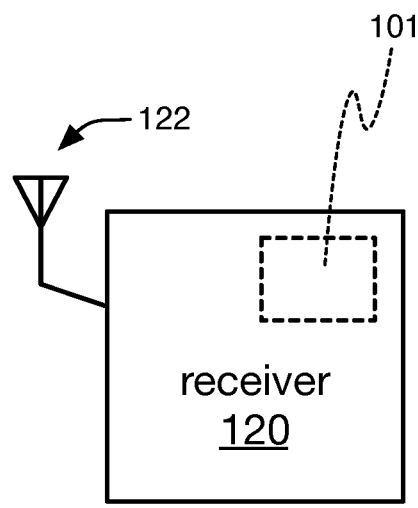

The receivers of the system can include one or more antennas 122 (e.g., configured to receive electromagnetic radiation transmitted by the transmitters), such as shown by way of example in FIG. 3B. The receivers can optionally include and/or be electrically coupled to (e.g., configured to deliver electrical power to) one or more client devices (e.g., batteries and/or battery-containing devices, such as smart phones and/or other electrical and/or electronic user devices). The receivers can optionally include one or more buffer energy stores (e.g., batteries), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.). In some embodiments, the receivers include one or more elements such as described (e.g., regarding the receivers of the system) in U.S. patent application Ser. No. 16/001,628, filed 6 Jun. 2018 and titled "SYSTEM AND METHOD FOR WIRELESS POWER RECEPTION", and/or in U.S. patent application Ser. No. 16/001,725, filed 6 Jun. 2018 and titled "METHOD AND SYSTEM FOR WIRELESS POWER DELIVERY", each of which is herein incorporated in its entirety by this reference.

The antennas can include directional antennas, omnidirectional antennas, and/or any other suitable antennas. The antennas can include narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. In some embodiments, some or all of the antennas of the transmitter (e.g., active antennas, passive antennas, etc.) and/or receiver include one or more tightly-coupled arrays of resonators, but can additionally or alternatively include a loosely-coupled array, a sparse array, a single resonator, and/or any other suitable antenna elements. The resonators can include resonant loops, cross-resonators, split-ring resonators, electro-inductive-capacitive resonators, other physically small resonators (e.g., small relative to their resonance wavelength), and/or any other suitable resonators. However, the resonators can be otherwise configured.

The antenna(s) can optionally include multiple arrays (and/or other resonator arrangements) arranged with different orientations, which can function to efficiently couple to radiation of different polarizations (e.g., orthogonal polarizations). In a first embodiment, an antenna includes parallel resonator layers (e.g., parallel resonator arrays), each layer having a different in-plane resonator orientation (e.g., orthogonal orientations, oriented at oblique angles, etc.). In a second embodiment, an antenna includes resonators on non-parallel planes (e.g., orthogonal planes, planes oriented at oblique angles, etc.). However, the antenna(s) can additionally or alternatively include any other suitable resonators and/or other antenna elements, and can have any other suitable arrangement. The antenna(s) can be a metamaterial or have any other suitable configuration.

Although referred to herein as antennas (e.g., active antennas, passive antennas, etc.), a person of skill in the art will recognize that the receiver antennas can additionally or alternatively include reception elements of any other suitable types.

The transmitters and receivers can additionally or alternatively be configured to transmit and/or receive energy in any other suitable form (e.g., sonic, optical, etc.), and/or to perform any other suitable role(s). In one embodiment, all or some of the transmitters can additionally function as receivers and/or all or some of the receivers can additionally function as transmitters. For example, the system can include a plurality of equivalent devices, each of which can wirelessly transmit power to and receive power from each of the other devices.

However, the system can additionally or alternatively include any other suitable receivers.

In some embodiments, the system can optionally include one or more relay nodes, which can function to relay power transmissions between other nodes of the system (e.g., transmitters, receivers, and/or other relay nodes). For example, the system can optionally include one or more relay nodes such as described in U.S. patent application Ser. No. 18/108,312, filed 10 Feb. 2023 and titled "SYSTEM AND METHOD FOR WIRELESS POWER NETWORKING" which is herein incorporated in its entirety by this reference.

In some examples, some or all nodes (e.g., transmitters, receivers, relay nodes, etc.) of the system can be hybrid nodes configured to perform multiple functions, such as transmitting, receiving, and/or relaying. For example, a relay node can additionally or alternatively be configured to transmit and/or receive, such as concurrent with and/or at different times from performing a relay function. In a first specific example, this can include splitting incident power into a relayed portion (e.g., redirected as described in more detail regarding the relay nodes) and a received portion (e.g., converted into electrical power at the node, such as described in more detail regarding the receivers). In a second specific example, this can include relaying incident power while also transmitting additional power (e.g., both redirecting the incident power into and adding more power into a desired output beam). In some examples, a node may be configured to either transmit or receive power (e.g., optionally while also relaying power), but not both, whereas in other examples, a node may have bidirectional capabilities (e.g., being configured to either transmit or receive power, optionally while also relaying power).

In some examples, one or more nodes of the system (e.g., transmitters and/or relay nodes) are operable to produce beam-like RF modes (e.g., Gaussian beams, Bessel beams, hybrids thereof, and/or approximations thereof, etc.).

The transmitters, receivers, and/or other nodes (or any suitable subset thereof) preferably each include a wireless communication module 101 (e.g., to enable communication with each other, with a controller of the system, etc.), but can additionally or alternatively include wired communication modules or any other suitable communication modules, or can omit communication modules; any relay nodes can optionally include such communication modules as well. The wireless communication modules preferably support (e.g., enable communication using) one or more wireless communication protocols (e.g., WiFi, Bluetooth, BLE, NFC, RF, IR, Zigbee, Z-wave, etc.). However, the transmitters and receivers can additionally or alternatively include any other suitable elements.

In some embodiments, the transmitters and/or receivers (and/or other nodes nodes) have an arbitrary and/or dynamic arrangement with respect to each other. In one example, the system includes a plurality of transmitters, each having a fixed position, and one or more receivers that undergo numerous changes in position and orientation (e.g., with respect to the transmitters, each other, etc.) over time. The system can optionally be arranged in a setting in which other nearby objects (e.g., obstacles to wireless power transmission) can also have an arbitrary and/or dynamic arrangement with respect to the elements of the system. However, the system can define any other suitable arrangements.

In some embodiments, some or all nodes of the system (e.g., transmitters, receivers, relay nodes, etc.) can be operable to function as both a transmitter and a receiver. For example, some or all such nodes can include one or more elements such as described in U.S. patent application Ser. No. 18/087,052, filed 22 Dec. 2022 and titled "BIDIRECTIONAL RF CIRCUIT AND METHOD OF USE", which is herein incorporated in its entirety by this reference. However, any or all nodes of the system can additionally or alternatively have any other suitable functionality.

The system can optionally include one or more pilot tone transmitters, which can function to provide one or more pilot tones (e.g., for use in frequency synchronization). In some examples, the pilot tone transmitter can include an oscillator (e.g., variable-frequency oscillator, such as a VCO) and a transmit chain (e.g., one or more power amplifiers and antennas) connected to the oscillator and configured to transmit the pilot tone generated by the oscillator. However, the system can additionally or alternatively include any other suitable pilot tone transmitters.

The system can optionally include one or more controllers, which can function to control system operation (e.g., control frequency synchronization, control single-transmitter and/or multi-transmitter configurations, control the system to perform the method for wireless power delivery and/or any suitable elements thereof, etc.). The controller preferably includes one or more communications modules (e.g., wireless communications modules) configured to communicate with (e.g., send control signals to, receive information from, etc.) other elements of the system (e.g., one or more transmitters and/or receivers of the system), and/or one or more logic elements (e.g., compute processors, such as a CPU, embedded logic, etc.). In some embodiments, the controller can include one or more elements such as described (e.g., regarding the controller) in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference. However, the system can additionally or alternatively include any other suitable controllers.

Further, the system for wireless power delivery can additionally or alternatively include any other suitable elements in any suitable arrangement.

4. Method

4.1 Synchronizing Transmitter Frequencies.

Synchronizing transmitter frequencies preferably functions to ensure that all transmitters of the system (or any suitable subset thereof) are transmitting at the same (or substantially the same) frequency (e.g., wherein a set of transmitters can be considered to be transmitting at substantially the same frequency if their transmission frequencies are sufficiently close to enable coherent transmission from all transmitters of the set).

In a first embodiment, transmitter frequencies are synchronized using a pilot tone. In this embodiment, synchronizing transmitter frequencies optionally includes transmitting one or more pilot tone signals and preferably includes, at each transmitter to be synchronized: receiving a pilot tone and converting the received pilot tone into a power transmission frequency.

In examples that include transmitting one or more pilot tone signals, the pilot tone is preferably transmitted at a pilot tone transmitter (or multiple pilot tone transmitters). The pilot tone transmitter can be a pilot tone transmitter of the system, a GNSS satellite (e.g., GPS satellite) or portion thereof, and/or any other suitable pilot tone source. However, this embodiment can alternatively include not transmitting a pilot tone signal (e.g., wherein one or more pilot tones generated by other means, such as automatically transmitted by one or more GNSS systems, can be received).

In this embodiment, each transmitter preferably receives the pilot tone and converts the received pilot tone into a power transmission frequency. These elements are preferably performed independently at each transmitter, but can additionally or alternatively be performed with any suitable level of collaboration between some or all of the transmitters. The pilot tone is preferably received at the pilot tone receiver of each transmitter, but can additionally or alternatively be received in any other suitable manner. The received pilot tone can be converted at a PLL of the transmitter, but can additionally or alternatively be converted by any other suitable elements of the transmitter. Converting the received pilot tone preferably includes multiplying the pilot tone by a factor (e.g., predetermined factor shared by all transmitters). In this manner, all transmitters receiving the pilot tone can generate the same power transmission frequency (e.g., frequency within the power transmission band).

In this embodiment, changes in the environment may alter the path length (and/or ratio of amplitudes between different path lengths, such as in examples in which the pilot signal reaches the transmitter(s) via multipath propagation) that the pilot tone signal follows to propagate to one or more of the transmitters (e.g., wherein these changes in path length differ from transmitter to transmitter). Such environmental changes can include people and/or objects changing their position and/or orientation within the environment, people and/or objects entering or leaving the environment, atmospheric effects (e.g., changing weather conditions), and/or any other suitable changes that may affect propagation of the pilot tone signals. These changes in path length can result in changes in the phase of the received pilot tone. In some examples, this embodiment can include aspects that function to reduce this phase noise (e.g., using a lower-frequency pilot tone that may inherently interact less with objects in the environment, thereby resulting in reduced phase noise arising from environmental changes). However, despite such efforts, some amount of phase noise (e.g., an undesirable or unacceptable amount of phase noise) will typically remain, which may, in some examples, prevent coherence of the power transmissions from the different transmitters of the system. Accordingly, the method can additionally or alternatively include taking measures to achieve and/or maintain phase coherence (e.g., as described below in more detail, such as regarding determining multi-transmitter configurations and/or maintaining coherence), especially when transmitter frequencies are synchronized in the manner described regarding this embodiment.

The pilot tone preferably defines a frequency outside the power transmission band. The pilot tone and the power transmission frequency (e.g., resulting frequency generated as described herein based on the pilot tone) are preferably harmonics of each other, such as wherein the frequency of one is an integer multiple of the frequency of the other, or wherein the two frequencies are related by a rational factor (wherein both are higher-order harmonics of some fundamental frequency, such as a fundamental frequency that is not transmitted or received in the performance of this method). Such an integer multiple or rational factor relationship can facilitate conversion of the received pilot tone into the power transmission frequency, such as by frequency multiplication at the PLLs. The pilot tone is preferably a lower frequency than the power transmission frequency, as the lower frequency may interact less with objects in the environment, resulting in reduced phase noise. In one example, a 915 MHz pilot tone is used and is multiplied by a 64/10 factor to generate a 5.856 GHz power transmission frequency.

In alternative examples, the pilot tone and power transmission frequency can be the same frequency. In such examples, there is no need to convert the pilot tone into a power transmission frequency. However, having both signals at the same frequency may present a noise challenge in detecting the pilot tone, as frequency-based filtering cannot typically be used to separate the pilot tone from the power transmissions (e.g., power transmission from other transmitters, from the transmitter doing the detection, etc.).

However, this embodiment can additionally or alternatively include using a pilot tone to synchronize transmitter frequencies in any other suitable manner.

In a second embodiment, transmitter frequencies are synchronized using a consensus-based approach. This embodiment preferably includes, at each transmitter of the system (or any suitable subset thereof): generating and transmitting a tone within the power transmission band, receiving tones from other transmitters, analyzing the received tones to determine a new target frequency for the transmitted tone, and iterating. These elements are preferably performed independently at each of the transmitters, but can additionally or alternatively be performed with any other suitable collaboration between some or all of the transmitters.

For the first iteration of this consensus-based approach, each transmitter preferably generates and transmits a tone at the same nominal frequency (e.g., predetermined frequency, frequency agreed upon through communication with the other transmitters such as communication via the wireless communication modules, frequency commanded by a controller such as via the wireless communication modules, etc.). However, use of the same nominal frequency typically will not result in production of the same actual frequency at each of the transmitters, such as due to variations in fabrication, configuration, state (e.g., temperature), and/or operation of the tone generation hardware (e.g., variable-frequency oscillator) at each transmitter and/or any other variations between the different transmitters. For subsequent iterations of the consensus-based approach (e.g., after the tones have been transmitted, received, and analyzed), each transmitter preferably uses the respective target frequency that it determined in the previous iteration. Generating and transmitting the tone is preferably performed at the VCO of each transmitter, but can additionally or alternatively be performed in any other suitable manner.

Each transmitter preferably receives (e.g., at its sniffer) tones from the other transmitters (e.g., the tones generated and transmitted for performance of this consensus-based approach). Each transmitter preferably analyzes (e.g., at its spectrum analyzer) the set of tones that are received. This analysis preferably includes determining the frequency corresponding to each received tone and determining a target frequency based on the frequencies of those received tones. In some examples, the target frequency can be an average of the received frequencies, such as an arithmetic mean. However, the target frequency can additionally or alternatively be determined (e.g., based on the received frequencies) in any other suitable manner.

These elements (and/or any other suitable subset thereof) are preferably repeated in an iterative manner (e.g., until a convergence criterion is met, such as until the received frequencies are all within a threshold frequency range of each other, such as sufficiently close to enable coherent transmission from the transmitters of the system). In subsequent iterations, the transmitters preferably adjust the frequency of the tone that they generate and transmit based on the target frequency that they determined in the previous iteration (e.g., setting the nominal frequency of tone generation equal to the target frequency they determined). Accordingly, after the first iteration, each power transmitter will typically generate a tone using a different nominal frequency from the others, but these differences will typically function to counteract the variances in actual frequency generated by the different transmitters, resulting in convergence toward a single actual frequency generated by all transmitters. Once convergence is achieved, the transmitters preferably continue using a frequency from the final iteration of this consensus-based approach, such as the most recently transmitted frequency (e.g., the same frequency transmitted during the final iteration), or the most recently determined target frequency (e.g., target frequency determined during the final iteration).

In some examples, the consensus-based approach can include one or more elements and/or can be performed such as described in Ouassal et al., "Decentralized frequency synchronization in distributed antenna arrays with quantized frequency states and directed communications", *IEEE Transactions on Antennas and Propagation* 68.7 (2020): 5280-5288, which is herein incorporated in its entirety by this reference.

However, this embodiment can additionally or alternatively include synchronizing transmitter frequencies using any other suitable consensus-based approach.

Additionally or alternatively, synchronizing transmitter frequencies can be performed using an optimization-based approach (e.g., an approach that involves iterating toward optimizing one or more objective functions). For example, using objective functions based on power received at one or more receivers, optimization over the transmission frequency of each transmitter (or any suitable subset thereof) could be performed (e.g., with the optimization goal of maximizing power transmission efficiency to the one or more receivers).

Additionally or alternatively, synchronizing transmitter frequencies can include selecting frequencies to achieve one or more secondary goals, such as reducing (e.g., minimizing) undesirable interactions between nearby transmitters. In one example, two nearby transmitters are tasked with transmitting power wirelessly to two different receivers (e.g., wherein a first transmitter transmits to a first receiver, and a second transmitter transmits to a second receiver); in this example, it may be desirable to select different transmission frequencies for the nearby transmitters (e.g., less than 1% apart in frequency, such as differing on the order of single MHz for frequencies in the GHz range), which can serve to reduce undesirable interactions between the nearby transmitters.

Further, the method can additionally or alternatively include synchronizing transmitter frequencies in any other suitable manner.

4.2 Determining Single-Transmitter Configurations.

Determining single-transmitter configurations preferably functions to determine, for each transmitter of the system (or any suitable subset thereof), a respective single-transmitter configuration (e.g., configuration for power transmission to one or more receivers of the system, such as an optimized configuration for power transmission to a receiver). The single-transmitter configuration preferably includes a set of phased array configuration parameters for the phased array of the transmitter (e.g., phase and/or gain for each transmit element of the phase array; beam-like mode parameters such as azimuth angle, elevation angle, and/or focal distance to a target such as a receiver; etc.), but can additionally or alternatively include any other suitable information. In some examples, each single-transmitter configuration describes a configuration for transmitting in a beam-like mode (e.g., Gaussian beam), such as a beam-like mode directed toward (or substantially toward) and/or focused at (or substantially at) a receiver (e.g., at an antenna or antenna array thereof); however, some or all of the single-transmitter configurations can additionally or alternatively describe any other suitable configurations.

In embodiments in which the system includes multiple receivers, determining single-transmitter configurations can include, for each transmitter, one or more of: determining one single-transmitter configuration for concurrent transmission to one, some, or all of the receivers; determining, for each receiver of the system, a respective single-transmitter configuration for transmission to the receiver; determining single-transmitter configurations for any suitable group(s) of receivers (e.g., as described in U.S. patent application Ser. No. 17/006,242, filed 28 Aug. 2020 and titled "METHOD AND SYSTEM FOR WIRELESS POWER DELIVERY", which is herein incorporated in its entirety by this reference, such as described therein regarding 'receiver groups', 'determining receiver groups S420', and/or 'performing multi-objective optimizations S430'); and/or determining any other suitable single-transmitter configurations for power transmission to any suitable entity or entities.

Determining the single-transmitter configurations preferably includes evaluating one or more transmission configurations (e.g., as part of one or more optimum searches performed to determine the single-transmitter configuration, such as local and/or global searches). Each transmission configuration is preferably evaluated as described in in U.S. patent application Ser. No. 16/001,725, filed 6 Jun. 2018 and titled "Method and System for Wireless Power Delivery", which is herein incorporated in its entirety by this reference (e.g., as described therein regarding 'determining transmission parameter values S200', such as regarding 'evaluating candidate transmission parameter values S220' in particular), but can additionally or alternatively be evaluated in any other suitable manner. For each transmission configuration evaluated, S410 preferably includes determining and/or caching the corresponding objective space values (e.g., the power received at each receiver, such as at each receiver within communication range of the transmitter).

Determining each single-transmitter configuration preferably includes performing one or more optimum searches, such as local searches and/or global searches (e.g., stochastic global search, deterministic global search, etc.). Each such search is preferably restricted to beam-like patterns (e.g., as described in U.S. patent application Ser. No. 16/001,725, filed 6 Jun. 2018 and titled "Method and System for Wireless Power Delivery", which is herein incorporated in its entirety by this reference, such as described regarding beamforming and/or beam-like patterns), such as a search over a beamforming parameter space (e.g., over a space defined by the azimuthal angle and polar angle, and optionally the focal distance, of a beam-like pattern). Accordingly, the search preferably results in determining an estimated angular position of each receiver (e.g., represented by the azimuthal angle and polar angle, and optionally the focal distance, of the optimal beam-like pattern for that receiver), and can optionally result in determining a metric associated with the optimal beam-like pattern (e.g., power received by the receiver, power delivery efficiency, etc.). Due to the limited dimensionality of the search space (e.g., two or three dimensions, corresponding to the azimuthal angle, polar angle, and optionally the focal distance), the search of beam-like patterns is preferably a global search (e.g., exhaustive global search, deterministic global search, stochastic global search, etc.) but can additionally or alternatively include a local search and/or any other suitable search technique(s).

However, some or all such searches can additionally or alternatively include searching over transmission configurations that are not limited to beam-like patterns. In some such embodiments, this search is limited to a local optimum search (e.g., as described in U.S. patent application Ser. No. 16/001,725 regarding performing a local optimum search S230), whereas in other such embodiments, the search for some or all of the receivers may include a global optimum search (e.g., as described in U.S. patent application Ser. No. 16/001,725 regarding performing a global optimum search S240). In such embodiments, the method can optionally include determining (e.g., calculating based on transmission parameters) one or more regions of high RF field intensity for an optimized transmission configuration, and, based on this region (or regions), determining location information about the receiver for which the optimization was performed (e.g., determining that the receiver is likely to be located near the highest-intensity region).

In some examples, determining the single-transmitter configurations is performed such as described in U.S. patent application Ser. No. 17/006,242, filed 28 Aug. 2020 and titled "METHOD AND SYSTEM FOR WIRELESS POWER DELIVERY", which is herein incorporated in its entirety by this reference (e.g., as described therein regarding 'performing preliminary assessments S410').

In some examples, determining the single-transmitter configurations can be performed based (in part or in whole) on information indicative of the arrangement of the nodes (e.g., transmitters, receivers, etc.). For example, such information can include information indicative of the position and/or orientation ("pose") of each transmitter (or any suitable subset thereof) relative to one or more receivers. Such information can be determined, in examples, based on global positioning information (e.g., based on information from one or more global navigation satellite systems, such as GPS), local positioning information (e.g., based on one or more sensor systems deployed within a region, which may include cameras, ultrasound sensors, triangulation- and/or trilateration-based sensors, radar-based sensors, and/or any other suitable sensors), dead reckoning information (e.g., based on one or more inertial measurement units and/or elements thereof, such as one or more accelerometers, gyroscopes, magnetometers, etc.), predetermined information (e.g., known position and/or orientation of one or more nodes, such as nodes having a fixed or substantially fixed pose), based on user-supplied information (e.g., wherein a user of the technology provides information indicative of the pose, such as manually inputting information indicative of the pose), and/or any other suitable information. In one example (e.g., in which one or more transmitters include a radar receiver, and/or in which the system includes one or more radar receivers), one or more transmitters can (temporarily) operate in a radar mode (e.g., in which one or more radar beams are swept through part or all of a region, and return signals are received at one or more of the radar receivers), such as a radar mode configured to detect positions of one or more other nodes (e.g., receivers, other transmitters, relay nodes, etc.). In a specific example, one or more other nodes (e.g., receivers, other transmitters, relay nodes, etc.) can operate (e.g., concurrently with another node's operation in radar mode) in a radar return mode (e.g., configured to facilitate radar mode operation, such as configuring in a retroreflective state and/or modulating their reflective properties to encode information (e.g., identification information). In some such examples, the relative pose may be known for some, but not all, of the nodes; in such examples, single-transmitter configurations can be determined in this manner for nodes having known pose and determined in an alternate manner for nodes having an unknown pose.

This relative pose information can be used, for example, to determine (e.g., calculate, determine based on a lookup table, etc.) transmission configuration parameters (e.g., phased array configuration parameters) likely to transmit efficiently to the location of one or more receivers (e.g., beam-like mode, such as a Gaussian beam-like mode, focused at or near the receiver; multi-beam mode, such as a linear combination of beam-like modes focused at or near each desired receiver; etc.). In a first example, the transmission configuration parameters determined in this manner can be used as the single-transmitter configurations. In a second example, the transmission configuration parameters determined in this manner can be used as a seed configuration for further single-transmitter optimizations (e.g., as described above, such as regarding the optimum search); in a specific example, the transmission configuration parameters determined in this manner can be used as an initial prediction for one or more local optimum searches, annealing-based searches, and/or any other suitable searches (e.g., searches configured to find an optimum within a vicinity of an initial prediction). However, the relative pose information and/or the resulting transmission configuration parameters can additionally or alternatively be used in any other suitable manner.

In some embodiments, the system includes one or more relay nodes (wherein a person of skill in the art will recognize that, although a relay node may relay rather than transmit power, the term 'single-transmitter configuration' can be understood in the context of a relay node to mean a configuration for relaying power from the relay node to a set of one or more downstream targets, preferably without any regard for coherent transmission to that set of downstream targets).

In a first variation, it may be preferable to determine single-transmitter configurations involving such relay nodes in an iterative manner. For example, single-transmitter configurations can first be determined for transmitting to each relay node to be used, and then, for each such relay node, a respective configuration for relaying power onward (e.g., toward one or more receivers, downstream relay nodes, etc.) can be determined; in the case of multiple layers of relay nodes (in which one relay node is downstream of another), this can continue iteratively until single-transmitter configurations have been determined for all layers of relay nodes.

In a second variation, it may be preferable to collectively treat a relay node and the upstream nodes that transmit power to that relay node as a single effective node (e.g., for the purposes of determining single-transmitter configurations); in the case of multiple layers of relay nodes, all relay nodes and transmitters upstream of a downstream relay node may be treated together with that downstream relay node as a single effective node. For example, determining a single-transmitter configuration for this single effective node can include optimizing over (some or all of) the configuration parameters of each node of that single effective node (e.g., analogous to the optimizations described above regarding a single transmitter).

In a third variation, some relay nodes may be treated such as described above regarding the first variation, whereas other relay nodes may be treated such as described above regarding the second variation.

However, the system can additionally or alternatively include determining single-transmitter configurations for relay nodes (and/or any other suitable nodes in a system including one or more relay nodes) in any other suitable manner.

The method can additionally or alternatively include determining single-transmitter configurations in any other suitable manner.

4.3 Determining Multi-Transmitter Configurations.

Determining one or more multi-transmitter configurations preferably functions to optimize coherent transmission by multiple transmitters. Determining multi-transmitter configurations preferably includes determining phase offsets between the different transmitters. For coherent transmission from N transmitters, a set of N−1 phase offsets can be determined (e.g., an inter-transmitter phase offset between the first transmitter and each of the other N−1 transmitters).

In a first embodiment, determining multi-transmitter configurations includes using a greedy optimization approach to determine inter-transmitter phase offsets. This embodiment preferably includes sequentially performing line searches (e.g., N−1 sequential line searches) to determine the inter-transmitter phase offsets.

For example, the greedy optimization approach can begin with transmitting power at two transmitters, each transmitting using the respective single-transmitter configuration determined for it as described above. In this example, a first line search is preferably performed by changing the phase offset between the two transmitters (e.g., while keeping all other transmitter configuration unchanged for these two transmitters). This is preferably achieved by applying a phase shift to one transmitter (e.g., applying a phase shift uniformly to each transmit element of its phase array, applying the phase shift upstream of splitting the source frequency to the different elements of the phased array, etc.) while leaving the other transmitter configuration fixed, but can additionally or alternatively be performed in any other suitable manner. The inter-transmitter phase offset resulting in the best performance is preferably selected, and this phase offset is preferably treated as a fixed value for all further optimization in this greedy approach. This set of elements is preferably repeated iteratively for each of the remaining transmitters (e.g., while continuing to transmit with the already-optimized set of transmitters under the phase offsets that have already been determined, while continuing to transmit only from a single one of the already-optimized set of transmitters, such as only continuing with the first transmitter and a single new transmitter at a time, etc.). For each of these iterations, this embodiment preferably includes beginning to transmit from the new transmitter using the respective single-transmitter configuration determined for it as described above, and performing a line search to determine the optimal phase offset for the new transmitter. These iterations are preferably continued until all N−1 inter-transmitter phase offsets have been determined.

However, the multi-transmitter configurations can additionally or alternatively be determined using any other suitable greedy optimization approach.

In a second embodiment, the multi-transmitter configurations are determined using a joint optimization approach.

A first variation of this embodiment includes performing a search over a multi-dimensional inter-transmitter phase offset space. In this variation, the joint optimization is preferably performed by transmitting from all transmitters (or any suitable subset thereof) using the respective single-transmitter configurations determined as described above, and performing a multi-dimensional search over the parameter space defined by the inter-transmitter phase offsets for all of the transmitting transmitters (e.g., performing a search over the N−1 dimensional space defined by inter-transmitter phase offsets between N different transmitters). In examples, this multi-dimensional search can be performed using any suitable local search algorithm(s) (e.g., gradient-based algorithm such as gradient descent, conjugate gradient descent, etc.; gradient-free algorithm such as Nelder-Mead, adaptive meshing, etc.), and/or any other suitable algorithms.

In a second variation, the joint optimization approach can include performing a search over a higher-dimensionality space (e.g., including more than N−1 dimensions for the N transmitters). For example, this variation can include extending the optimization search beyond the single-transmitter configurations determined as described above, and/or extending the search beyond beam-like modes entirely (e.g., wherein the search space would not be restricted to configurations in which each individual transmitter is configured to produce a beam-like mode). In this variation, the search space can include individual transmitter configurations (e.g., phase and/or gain settings for individual elements of the one or more phased arrays). For example, the joint optimization approach can include performing a search such as described in U.S. patent application Ser. No. 16/706,131, filed 6 Dec. 2019 and titled "METHOD AND SYSTEM FOR WIRELESS POWER DELIVERY", which is herein incorporated in its entirety by this reference (e.g., as described therein regarding 'determining transmission parameter values S200', such as regarding 'performing a local optimum search S230' and/or 'performing a global optimum search S240' in particular).

Additionally or alternatively (e.g., in either variation described above), the joint optimization approach can include first performing a search based on transmitting only from a subset of the transmitters (e.g., more than two transmitters but less than the total number of transmitters designated for use together as a coherent transmission source), preferably performing one or more multi-dimensional searches such as described above regarding the first and/or second variation. In a first example, after performing this search, one or more additional transmitters can be added to the subset and an additional optimum search can be performed based on transmitting only from this larger subset of transmitters; iteratively, further transmitters can be added and further optimum searches can be performed until all transmitters designated for use together have been added to the subset and joint optimization has been performed over this entire set of transmitters designated for use together. In a second example, one or more additional searches can be performed in an analogous manner, each based on transmitting only from a different subset of the transmitters (e.g., wherein these different subsets partition the transmitters designated for use together as a coherent transmission source); then these different groups of transmitters can be joined (e.g., one additional group at a time, all at once, etc.) for one or more joint optimization searches over the resulting larger group(s). In a third example, aspects of the first and second examples may be combined (e.g., searches may be performed for multiple subsets such as in the second example, one or more such subsets may be grown such as in the first example, and the resulting subsets may be combined such as in the second example; searches may be performed for multiple subsets such as in the second example, the resulting subsets may be combined such as in the second example, and then additional transmitters may be added to the combined set such as in the first example; etc.).

However, the joint optimization can additionally or alternatively be performed in any other suitable manner.

In some examples, determining the multi-transmitter configurations can be performed based (in part or in whole) on information indicative of the arrangement of the nodes (e.g., transmitters, receivers, etc.); in some such examples, the method may omit determining single-transmitter configurations for some or all of the transmitters (e.g., wherein the multi-transmitter configurations are determined based on information indicative of the node arrangement, instead of or in addition to based on the single-transmitter configurations, and so it may not be useful and/or necessary to determine single-transmitter configurations for some or all nodes for which their relative arrangement is known). For example, such information can include information indicative of the position and/or orientation ("pose") of each transmitter (or any suitable subset thereof) relative to one or more receivers. Such information can be determined, in examples, based on global positioning information (e.g., based on information from one or more global navigation satellite systems, such as GPS), local positioning information (e.g., based on one or more sensor systems deployed within a region, which may include cameras, ultrasound sensors, triangulation- and/or trilateration-based sensors, and/or any other suitable sensors), dead reckoning information (e.g., based on one or more inertial measurement units and/or elements thereof, such as one or more accelerometers, gyroscopes, magnetometers, etc.), predetermined information (e.g., known position and/or orientation of one or more nodes, such as nodes having a fixed or substantially fixed pose), and/or any other suitable information. In some such examples, the relative pose may be known for some, but not all, of the nodes; in such examples, multi-transmitter configurations can be determined in this manner for nodes having known pose and determined in an alternate manner for nodes having an unknown pose. For example, first determining one or more multi-transmitter configurations for nodes having known pose (and then optionally performing an optimum search based on some or all of these multi-transmitter configurations, such as using them as an initial seed value), and then adding additional transmitters in a manner analogous to that described above regarding the third variation of the second embodiment.

This relative pose information can be used, for example, to determine (e.g., calculate, determine based on a lookup table, etc.) transmission configuration parameters (e.g., phased array configuration parameters) likely to transmit efficiently to the location of one or more receivers (e.g., beam-like mode, such as a Gaussian beam-like mode, focused at or near the receiver; multi-beam mode, such as a linear combination of beam-like modes focused at or near each desired receiver; etc.), preferably wherein multiple transmitters are treated as portions of a sparse transmit array (e.g., sparse array defined by each of the transmitters to be used in coherence, or any suitable subset thereof such as the subset of such transmitters for which the relative pose is known). In some such examples, each transmitter can independently determine the appropriate configuration parameters for its own transmit array, preferably based on shared configuration information, such as a desired position or set of positions to transmit to (e.g., based on known and/or estimated positions of one or more receivers, each transmitter can calculate and/or otherwise determine appropriate configuration parameters for the sparse transmit array to generate a beam-like mode directed toward the position, such as focused at or near the position, or a multi-beam mode directed toward each position or any suitable subset thereof). Such distribution of configuration parameter determination can, in some examples, function to reduce network traffic demands (e.g., due to a significantly reduced amount of information needed to be communicated between elements of the system) and/or reduce overall time needed to perform such determination (e.g., by distributing the determination over a plurality of transmitters working in parallel). However, the configuration parameters can additionally or alternatively be determined by any suitable elements (e.g., wherein the subset of such parameters associated with any given transmitter are preferably communicated to that transmitter).

In a first example, the transmission configuration parameters determined in this manner can be used as the multi-transmitter configurations. In a second example, the transmission configuration parameters determined in this manner can be used as a seed configuration for further multi-transmitter optimizations (e.g., as described above, such as regarding optimum searches, preferably joint optimum searches); in a specific example, the transmission configuration parameters determined in this manner can be used as an initial prediction for one or more local optimum searches, annealing-based searches, and/or any other suitable searches (e.g., searches configured to find an optimum within a vicinity of an initial prediction). However, the relative pose information and/or the resulting transmission configuration parameters can additionally or alternatively be used in any other suitable manner.

In some embodiments, the system includes one or more relay nodes (wherein a person of skill in the art will recognize that, although a relay node may relay rather than transmit power, the term 'multi-transmitter configuration' can be understood in the context of a relay node to mean a configuration for coherently transmitting and/or relaying power from the transmitters and/or relay nodes to a set of one or more downstream targets).

In a first variation, it may be preferable to determine multi-transmitter configurations involving such relay nodes in an iterative manner. For example, single- and/or multi-transmitter configurations can first be determined for transmitting to each relay node to be used, and then a multi-transmitter configuration for transmitting and relaying power onward (e.g., toward one or more receivers, downstream relay nodes, etc.) can be determined; in the case of multiple layers of relay nodes (in which one relay node is downstream of another), this can continue iteratively until multi-transmitter configurations have been determined that include all layers of relay nodes.

In a second variation, it may be preferable to collectively treat a relay node and the upstream nodes that transmit power to that relay node as a single effective node (e.g., for the purposes of determining multi-transmitter configurations); in the case of multiple layers of relay nodes, all relay nodes and transmitters upstream of a downstream relay node may be treated together with that downstream relay node as a single effective node. For example, including this this effective node while determining a multi-transmitter configuration can include optimizing over (some or all of) the configuration parameters of each node of that effective node (e.g., analogous to the optimizations described above regarding a single transmitter).

In a third variation, some relay nodes may be treated such as described above regarding the first variation, whereas other relay nodes may be treated such as described above regarding the second variation.

However, the system can additionally or alternatively include determining a multi-transmitter configuration including one or more relay nodes (and/or any other suitable nodes in a system including one or more relay nodes) in any other suitable manner.

In some examples, determining the multi-transmitter configuration(s) can additionally or alternatively include performing one or more additional optimum searches. For example, after determining a multi-transmitter configuration, one or more searches (e.g., local searches, stochastic searches, "annealing" searches, etc.) can be performed (e.g., using the previously-determined configuration as a seed configuration), which can function to further optimize the multi-transmitter configuration.

In some examples, determining the multi-transmitter configuration(s) can include altering the configuration to produce a desired spatial energy pattern at one or more receivers (e.g., to generate a more uniform energy distribution across a receiver). In one example, in which a plurality of transmitters are transmitting a beam-like mode toward a single receiver (e.g., toward a central point of the receiver), this can include altering transmission for each such transmitter (or any suitable subset thereof) such that its respective energy transmission is adjusted spatially in a different direction from the other transmitters (e.g., each transmitter adjusting radially outward from the central point, along different radii, such as radii distributed substantially equiangularly about the central point). This can function to increase energy reception and/or conversion efficiency within the receiver (e.g., by reducing and/or elimination power mismatches between arrayed components of the receiver that may be electrically connected in parallel and/or series). However, the multi-transmitter configuration(s) can additionally or alternatively be altered in any other suitable manner.

The method can additionally or alternatively include determining the multi-transmitter configurations in any other suitable manner.

4.4 Maintaining Coherence.

The method can optionally include maintaining coherence, which can function to account for and/or correct for drift (e.g., phase drift, frequency drift, etc.) between the transmitters. In some embodiments, maintaining coherence can include repeating some or all of the method elements described above (e.g., resynchronizing frequencies, re-optimizing single-transmitter configurations, and/or re-optimizing multi-transmitter configurations). In many examples, it may not be necessary to re-optimize single-transmitter configurations in order to correct for drift (e.g., phase and/or frequency drift) between the transmitters, as small changes in transmission frequency may be unlikely to have a significant effect on the single-transmitter configurations, and changes in inter-transmitter phase shifts should have no (or substantially no) effect on single-transmitter configurations.

This repetition can be performed periodically, in response to trigger events (e.g., reduction in power transmission efficiency to one or more receivers, detection of decoherence between the different transmitters, etc.), and/or with any other suitable timing.

In some embodiments, maintaining coherence can include checking for decoherence, such as using a perturb and observe approach. Such an approach can include occasionally (e.g., periodically, sporadically, in response to trigger events, etc.) testing small changes (e.g., both increases and reductions) of one or more parameters, such as the nominal frequency for power transmission frequency generation at a transmitter, inter-transmitter phase offset, and the like. These tests are preferably performed for one parameter at a time, which can facilitate isolation of parameters that may have drifted from their ideal configuration. If any of these test changes results in increased (rather than decreased or substantially unchanged) power transmission efficiency, this increase may be indicative of drift and/or decoherence. As such, this increase can trigger a re-optimization (e.g., repetition of the method element or elements associated with setting the parameter responsible for the increase, and/or optionally repeating some or all of the subsequent elements of the method). In a first example in which changing the nominal frequency for frequency generation at a first transmitter results in increased power transmission efficiency, this can be indicative of frequency drift between the different transmitters, and can trigger repetition of transmitter frequency synchronization such as described above. Following the transmitter frequency resynchronization, the method can optionally include redetermining single-transmitter configurations (although this may be unnecessary for small changes in power transmission frequency), and/or redetermining multi-transmitter configurations (e.g., to establish phase coherence under the new power transmission frequency environment). In a second example in which changing an inter-transmitter phase offset (e.g., between a first and second transmitter) results in increased power transmission, this increase can trigger re-optimization of the multi-transmitter configurations (e.g., redetermination of the optimal inter-transmitter phase offsets, such as of all inter-transmitter phase offsets, only of the phase offset between the first and second transmitters, any suitable subset of inter-transmitter phase offsets, etc.).

However, the method can additionally or alternatively include maintaining coherence in any other suitable manner.

Further, the method can additionally or alternatively include any other suitable elements performed in any suitable manner.

5. Specific Examples

A numbered list of specific examples of the technology described herein are provided below. A person of skill in the art will recognize that the scope of the technology is not limited to and/or by these specific examples.

1. A method for coherent wireless power transmission, comprising:
    at a first transmitter, wirelessly transmitting propagating radio frequency (RF) radiation defining a first transmitter frequency;
    at a second transmitter separate from the first transmitter:
        receiving a first signal; and
        based on the first signal, controlling the second transmitter such that it wirelessly transmits propagating RF radiation defining a second transmitter frequency substantially equal to the first transmitter frequency;

determining a first transmitter configuration for wirelessly transmitting power from the first transmitter to a set of one or more receivers;

determining a second transmitter configuration for wirelessly transmitting power from the second transmitter to the set of one or more receivers;

based on the first transmitter configuration and the second transmitter configuration, determining a joint transmitter configuration for coherently transmitting power from the first and second transmitters to the set of one or more receivers; and concurrently operating the first and second transmitters based on the joint transmitter configuration.

2. The method of Specific Example 1, further comprising, at a pilot tone transmitter, transmitting the first signal, wherein:

the first signal comprises a pilot tone; and controlling the second transmitter based on the first signal comprises:

using the pilot tone to drive a phase-locked loop (PLL) of the second transmitter; and generating the second transmitter frequency based on the PLL.

3. The method of Specific Example 2, wherein:

the pilot tone defines a pilot frequency substantially different from the first and second transmitter frequencies; and generating the second transmitter frequency based on the PLL comprises:

generating an initial signal defining the pilot frequency; and at a frequency multiplier of the second transmitter, generating the second transmitter frequency from the initial signal.

4. The method of Specific Example 2 or 3, further comprising, at the first transmitter:

receiving the pilot tone;

using the pilot tone to drive a PLL of the first transmitter; and generating the first transmitter frequency based on the PLL.

5. The method of Specific Example 2 or 3, wherein the first transmitter comprises the pilot tone transmitter.

6. The method of any of the preceding Specific Examples, wherein determining the joint transmitter configuration comprises, during a first time:

at the first transmitter, wirelessly transmitting power based on the first transmitter configuration, thereby wirelessly transmitting propagating RF radiation substantially defining the first transmitter frequency;

at the second transmitter, wirelessly transmitting power based on the second transmitter configuration, thereby wirelessly transmitting propagating RF radiation substantially defining the second transmitter frequency; and performing an optimum search based on power reception at the set of one or more receivers, comprising varying a transmission phase offset between the first transmitter and the second transmitter.

7. The method of Specific Example 6, wherein:

a varying transmitter, selected from the group consisting of the first transmitter and the second transmitter, comprises a phase shifter configured to uniformly shift the phase of all transmissions from the varying transmitter; and varying the relative transmission phase offset comprises, at the varying transmitter, varying a phase shift amount imposed by the phase shifter.

8. The method of Specific Example 6 or 7, wherein the first and second transmitter define a first transmitter group, the method further comprising:

at a third transmitter separate from the first and second transmitters:

receiving the first signal; and based on the first signal, controlling the third transmitter such that it wirelessly transmits propagating RF radiation defining a third transmitter frequency substantially equal to the first and second transmitter frequencies;

determining a third transmitter configuration for wirelessly transmitting power from the third transmitter to the set of one or more receivers;

while concurrently operating the first and second transmitters based on the joint transmitter configuration:

at the third transmitter, wirelessly transmitting power based on the third transmitter configuration, thereby wirelessly transmitting propagating RF radiation substantially defining the third transmitter frequency;

performing a second optimum search based on power reception at the set of one or more receivers, comprising varying a transmission phase offset between the first transmitter group and the third transmitter; and based on the second optimum search, determining a second joint transmitter configuration for coherently transmitting power from the first, second, and third transmitters to the set of one or more receivers; and concurrently operating the first, second, and third transmitters based on the second joint transmitter configuration.

9. The method of any one of Specific Examples 1-7, further comprising:

at a third transmitter separate from the first and second transmitters:

receiving the first signal; and based on the first signal, controlling the third transmitter such that it wirelessly transmits propagating RF radiation defining a third transmitter frequency substantially equal to the first and second transmitter frequencies;

determining a third transmitter configuration for wirelessly transmitting power from the third transmitter to the set of one or more receivers; and concurrent with operating the first and second transmitters based on the joint transmitter configuration, operating the third transmitter based on the joint transmitter configuration;

wherein:

determining the joint transmitter configuration is performed based further on the third transmitter configuration; and the joint transmitter configuration is for coherently transmitting power from the first, second, and third transmitters to the set of one or more receivers.

10. The method of Specific Example 9, further comprising, at a pilot tone transmitter, transmitting the first signal, wherein:

the first signal comprises a pilot tone;

controlling the second transmitter based on the first signal comprises:

using the pilot tone to drive a second transmitter phase-locked loop (PLL) of the second transmitter; and generating the second transmitter frequency based on the second transmitter PLL; and controlling the third transmitter based on the first signal comprises:

using the pilot tone to drive a third transmitter phase-locked loop (PLL) of the third transmitter; and generating the third transmitter frequency based on the third transmitter PLL.

11. The method of Specific Example 9, wherein determining the joint transmitter configuration comprises, during a first time:

at the first transmitter, wirelessly transmitting power based on the first transmitter configuration, thereby wirelessly transmitting propagating RF radiation substantially defining the first transmitter frequency;

at the second transmitter, wirelessly transmitting power based on the second transmitter configuration, thereby wirelessly transmitting propagating RF radiation substantially defining the second transmitter frequency;

at the third transmitter, wirelessly transmitting power based on the third transmitter configuration, thereby wirelessly transmitting propagating RF radiation substantially defining the third transmitter frequency; and performing an optimum search based on power reception at the set of one or more receivers, comprising varying:

a first transmission phase offset between the first transmitter and the second transmitter; and a second transmission phase offset between the second transmitter and the third transmitter.

12. The method of Specific Example 11, wherein performing the optimum search comprises jointly varying the first and second transmission phase offsets.

13. The method of Specific Example 11 or 12, wherein the optimum search comprises a local optimum search.

14. The method of Specific Example 13, wherein the optimum search is a local optimum search.

15. The method of any one of Specific Examples 11-13, wherein the optimum search comprises a stochastic search.

16. The method of any one of Specific Examples 1-10, wherein determining the joint transmitter configuration comprises performing an optimum search based on power reception at the set of one or more receivers.

17. The method of Specific Example 16, further comprising:

while concurrently operating the first and second transmitters based on the joint transmitter configuration:

determining a first power reception metric indicative of power delivery efficiency to the set of one or more receivers under the joint transmitter configuration;

perturbing operation of at least one of the first transmitter or the second transmitter; and while operation of the first transmitter is perturbed, determining a second power reception metric indicative of power delivery efficiency to the set of one or more receivers under the perturbed joint transmitter configuration, wherein the second power reception metric exceeds the first power reception metric;

in response to the second power reception metric exceeding the first power reception metric, determining an updated joint transmitter configuration, comprising performing a second optimum search based on power reception at the set of one or more receivers.

18. The method of Specific Example 16 or 17, wherein the optimum search comprises a local optimum search.

19. The method of Specific Example 16 or 17, wherein the optimum search is a local optimum search.

20. The method of any one of Specific Examples 16-18, wherein the optimum search comprises a stochastic search.

21. The method of any of the preceding Specific Examples, wherein the first transmitter configuration is operable to wirelessly transmit power to at least one receiver of the set of one or more receivers via a relay node; the method further comprising:

at the first transmitter, wirelessly transmitting power based on the first transmitter configuration or the joint transmitter configuration;

while wirelessly transmitting based on the first transmitter configuration or the joint transmitter configuration, determining a relay configuration for relaying power incident upon the relay node to the at least one receiver; and while concurrently operating the first and second transmitters based on the joint transmitter configuration, configuring the relay node based on the relay configuration.

22. The method of Specific Example 21, wherein the relay configuration is operable to relay power to the at least one receiver via a second relay node; the method further comprising:

while wirelessly transmitting based on the first transmitter configuration or the joint transmitter configuration:

configuring the relay node based on the relay configuration; and while the relay node is configured based on the relay configuration, determining a second relay configuration for relaying power incident upon the second relay node to the at least one receiver; and while concurrently operating the first and second transmitters based on the joint transmitter configuration and while the relay node is configured based on the relay configuration, configuring the second relay node based on the second relay configuration.

23. The method of Specific Example 21, the method further comprising, before determining the relay configuration, while wirelessly transmitting based on the first transmitter configuration, determining an initial relay configuration for relaying power incident upon the relay node to the at least one receiver; wherein:

determining the relay configuration is performed while concurrently operating the first and second transmitters based on the joint transmitter configuration; and determining the relay configuration is performed based on the initial relay configuration.

24. The method of Specific Example 23, wherein the relay configuration is operable to relay power to the at least one receiver via a second relay node; the method further comprising:

while wirelessly transmitting based on the first transmitter configuration or the joint transmitter configuration:

configuring the relay node based on the initial relay configuration or the relay configuration; and while the relay node is configured based on the initial relay configuration or the relay configuration, determining a second relay configuration for relaying power incident upon the second relay node to the at least one receiver; and while concurrently operating the first and second transmitters based on the joint transmitter configuration and while the relay node is configured based on the relay configuration, configuring the second relay node based on the second relay configuration.

25. The method of Specific Example 23 or 24, wherein:
determining the initial relay configuration comprises performing a first optimum search; and
determining the relay configuration comprises performing a second optimum search.

26. A system for coherent wireless power transmission, wherein the system is configured to perform the method of any one of the preceding Specific Examples.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for coherent wireless power transmission, comprising:
   at a first transmitter, wirelessly transmitting propagating radio frequency (RF) radiation defining a first transmitter frequency;
   at a pilot tone transmitter, transmitting a first signal, wherein the first signal comprises a pilot tone defining a pilot frequency substantially different from the first transmitter frequency;
   at a second transmitter separate from the first transmitter:
      receiving the first signal; and
      based on the first signal, controlling the second transmitter such that it wirelessly transmits propagating RF radiation defining a second transmitter frequency substantially equal to the first transmitter frequency, comprising:
         using the pilot tone to drive a phase-locked loop (PLL) of the second transmitter; and
         generating the second transmitter frequency based on the PLL, comprising generating an initial signal defining the pilot frequency and, at a frequency multiplier of the second transmitter, generating the second transmitter frequency from the initial signal;
   determining a first transmitter configuration for wirelessly transmitting power from the first transmitter to a set of one or more receivers;
   determining a second transmitter configuration for wirelessly transmitting power from the second transmitter to the set of one or more receivers;
   based on the first transmitter configuration and the second transmitter configuration, determining a joint transmitter configuration for coherently transmitting power from the first and second transmitters to the set of one or more receivers; and
   concurrently operating the first and second transmitters based on the joint transmitter configuration.

2. The method of claim 1, further comprising, at the first transmitter:
   receiving the pilot tone;
   using the pilot tone to drive a PLL of the first transmitter; and
   generating the first transmitter frequency based on the PLL.

3. The method of claim 1, wherein the first transmitter comprises the pilot tone transmitter.

4. The method of claim 1, wherein determining the joint transmitter configuration comprises, during a first time:
   at the first transmitter, wirelessly transmitting power based on the first transmitter configuration, thereby wirelessly transmitting propagating RF radiation substantially defining the first transmitter frequency;
   at the second transmitter, wirelessly transmitting power based on the second transmitter configuration, thereby wirelessly transmitting propagating RF radiation substantially defining the second transmitter frequency; and
   performing an optimum search based on power reception at the set of one or more receivers, comprising varying a transmission phase offset between the first transmitter and the second transmitter.

5. The method of claim 4, wherein:
   a varying transmitter, selected from the group consisting of the first transmitter and the second transmitter, comprises a phase shifter configured to uniformly shift the phase of all transmissions from the varying transmitter; and
   varying the transmission phase offset comprises, at the varying transmitter, varying a phase shift amount imposed by the phase shifter.

6. The method of claim 1, further comprising:
   at a third transmitter separate from the first and second transmitters:
      receiving the first signal; and
      based on the first signal, controlling the third transmitter such that it wirelessly transmits propagating RF radiation defining a third transmitter frequency substantially equal to the first and second transmitter frequencies;

determining a third transmitter configuration for wirelessly transmitting power from the third transmitter to the set of one or more receivers; and concurrent with operating the first and second transmitters based on the joint transmitter configuration, operating the third transmitter based on the joint transmitter configuration;

wherein:

determining the joint transmitter configuration is performed based further on the third transmitter configuration; and the joint transmitter configuration is for coherently transmitting power from the first, second, and third transmitters to the set of one or more receivers.

7. The method of claim 6, further comprising, at a pilot tone transmitter, transmitting the first signal, wherein:

the first signal comprises a pilot tone;

controlling the second transmitter based on the first signal comprises:

using the pilot tone to drive a second transmitter phase-locked loop (PLL) of the second transmitter; and generating the second transmitter frequency based on the second transmitter PLL; and controlling the third transmitter based on the first signal comprises:

using the pilot tone to drive a third transmitter phase-locked loop (PLL) of the third transmitter; and generating the third transmitter frequency based on the third transmitter PLL.

8. The method of claim 6, wherein determining the joint transmitter configuration comprises, during a first time:

at the first transmitter, wirelessly transmitting power based on the first transmitter configuration, thereby wirelessly transmitting propagating RF radiation substantially defining the first transmitter frequency;

at the second transmitter, wirelessly transmitting power based on the second transmitter configuration, thereby wirelessly transmitting propagating RF radiation substantially defining the second transmitter frequency;

at the third transmitter, wirelessly transmitting power based on the third transmitter configuration, thereby wirelessly transmitting propagating RF radiation substantially defining the third transmitter frequency; and performing an optimum search based on power reception at the set of one or more receivers, comprising varying:

a first transmission phase offset between the first transmitter and the second transmitter; and a second transmission phase offset between the second transmitter and the third transmitter.

9. The method of claim 8, wherein performing the optimum search comprises jointly varying the first and second transmission phase offsets.

10. The method of claim 8, wherein the optimum search is a local optimum search.

11. The method of claim 8, wherein the optimum search comprises a stochastic search.

12. The method of claim 1, wherein determining the joint transmitter configuration comprises performing an optimum search based on power reception at the set of one or more receivers.

13. The method of claim 12, further comprising:

while concurrently operating the first and second transmitters based on the joint transmitter configuration:

determining a first power reception metric indicative of power delivery efficiency to the set of one or more receivers under the joint transmitter configuration;

perturbing operation of at least one of the first transmitter or the second transmitter; and while operation of the first transmitter is perturbed, determining a second power reception metric indicative of power delivery efficiency to the set of one or more receivers under the perturbed joint transmitter configuration, wherein the second power reception metric exceeds the first power reception metric;

in response to the second power reception metric exceeding the first power reception metric, determining an updated joint transmitter configuration, comprising performing a second optimum search based on power reception at the set of one or more receivers.

14. The method of claim 1, wherein the first transmitter configuration is operable to wirelessly transmit power to at least one receiver of the set of one or more receivers via a relay node; the method further comprising:

at the first transmitter, wirelessly transmitting power based on the first transmitter configuration or the joint transmitter configuration;

while wirelessly transmitting based on the first transmitter configuration or the joint transmitter configuration, determining a relay configuration for relaying power incident upon the relay node to the at least one receiver; and while concurrently operating the first and second transmitters based on the joint transmitter configuration, configuring the relay node based on the relay configuration.

15. The method of claim 14, wherein the relay configuration is operable to relay power to the at least one receiver via a second relay node; the method further comprising:

while wirelessly transmitting based on the first transmitter configuration or the joint transmitter configuration:

configuring the relay node based on the relay configuration; and while the relay node is configured based on the relay configuration, determining a second relay configuration for relaying power incident upon the second relay node to the at least one receiver; and while concurrently operating the first and second transmitters based on the joint transmitter configuration and while the relay node is configured based on the relay configuration, configuring the second relay node based on the second relay configuration.

16. The method of claim 14, the method further comprising, before determining the relay configuration, while wirelessly transmitting based on the first transmitter configuration, determining an initial relay configuration for relaying power incident upon the relay node to the at least one receiver; wherein:

determining the relay configuration is performed while concurrently operating the first and second transmitters based on the joint transmitter configuration; and determining the relay configuration is performed based on the initial relay configuration.

17. The method of claim 16, wherein:

determining the initial relay configuration comprises performing a first optimum search; and determining the relay configuration comprises performing a second optimum search.

18. A method for coherent wireless power transmission, comprising:

at a first transmitter, wirelessly transmitting propagating radio frequency (RF) radiation defining a first transmitter frequency;

at a second transmitter separate from the first transmitter:

receiving a first signal; and
based on the first signal, controlling the second transmitter such that it wirelessly transmits propagating RF radiation defining a second transmitter frequency substantially equal to the first transmitter frequency;
determining a first transmitter configuration for wirelessly transmitting power from the first transmitter to a set of one or more receivers;
determining a second transmitter configuration for wirelessly transmitting power from the second transmitter to the set of one or more receivers;
based on the first transmitter configuration and the second transmitter configuration, determining a joint transmitter configuration for coherently transmitting power from the first and second transmitters to the set of one or more receivers, wherein determining the joint transmitter configuration comprises, during a first time:
  at the first transmitter, wirelessly transmitting power based on the first transmitter configuration, thereby wirelessly transmitting propagating RF radiation substantially defining the first transmitter frequency;
  at the second transmitter, wirelessly transmitting power based on the second transmitter configuration, thereby wirelessly transmitting propagating RF radiation substantially defining the second transmitter frequency; and
  performing an optimum search based on power reception at the set of one or more receivers, comprising varying a transmission phase offset between the first transmitter and the second transmitter;
at a third transmitter separate from the first and second transmitters:
  receiving the first signal; and
  based on the first signal, controlling the third transmitter such that it wirelessly transmits propagating RF radiation defining a third transmitter frequency substantially equal to the first and second transmitter frequencies;
determining a third transmitter configuration for wirelessly transmitting power from the third transmitter to the set of one or more receivers;
concurrently operating the first and second transmitters based on the joint transmitter configuration, wherein the first and second transmitter define a first transmitter group;
while concurrently operating the first and second transmitters based on the joint transmitter configuration:
  at the third transmitter, wirelessly transmitting power based on the third transmitter configuration, thereby wirelessly transmitting propagating RF radiation substantially defining the third transmitter frequency;
  performing a second optimum search based on power reception at the set of one or more receivers, comprising varying a transmission phase offset between the first transmitter group and the third transmitter; and
  based on the second optimum search, determining a second joint transmitter configuration for coherently transmitting power from the first, second, and third transmitters to the set of one or more receivers; and
concurrently operating the first, second, and third transmitters based on the second joint transmitter configuration.

19. The method of claim 18, wherein the first transmitter configuration is operable to wirelessly transmit power to at least one receiver of the set of one or more receivers via a relay node; the method further comprising:
  at the first transmitter, wirelessly transmitting power based on the first transmitter configuration or the joint transmitter configuration;
  while wirelessly transmitting based on the first transmitter configuration or the joint transmitter configuration, determining a relay configuration for relaying power incident upon the relay node to the at least one receiver; and
  while concurrently operating the first and second transmitters based on the joint transmitter configuration, configuring the relay node based on the relay configuration.

20. The method of claim 19, wherein the relay configuration is operable to relay power to the at least one receiver via a second relay node; the method further comprising:
  while wirelessly transmitting based on the first transmitter configuration or the joint transmitter configuration:
    configuring the relay node based on the relay configuration; and
    while the relay node is configured based on the relay configuration, determining a second relay configuration for relaying power incident upon the second relay node to the at least one receiver; and
  while concurrently operating the first and second transmitters based on the joint transmitter configuration and while the relay node is configured based on the relay configuration, configuring the second relay node based on the second relay configuration.

* * * * *